Sept. 8, 1964 R. P. SCHOLFIELD ETAL 3,147,849
FILING APPARATUS
Filed June 13, 1961 9 Sheets-Sheet 4

INVENTORS
RICHARD P. SCHOLFIELD
TIMOTHY F. DONOVAN
BY Cushman, Darby & Cushman
ATTORNEYS Sept. 8, 1964 R. P. SCHOLFIELD ETAL 3,147,849
FILING APPARATUS
Filed June 13, 1961 9 Sheets-Sheet 6

INVENTORS
RICHARD P. SCHOLFIELD
TIMOTHY F. DONOVAN
BY Cushman, Darby & Cushman
ATTORNEYS

Sept. 8, 1964  R. P. SCHOLFIELD ETAL  3,147,849
FILING APPARATUS
Filed June 13, 1961  9 Sheets-Sheet 7

INVENTORS
RICHARD P. SCHOLFIELD
TIMOTHY F. DONOVAN
BY Cushman, Darby & Cushman
ATTORNEYS Sept. 8, 1964 R. P. SCHOLFIELD ETAL 3,147,849
FILING APPARATUS
Filed June 13, 1961 9 Sheets-Sheet 8

INVENTORS
RICHARD P. SCHOLFIELD
TIMOTHY F. DONOVAN
BY Cushman, Darby & Cushman
ATTORNEYS

United States Patent Office

3,147,849
Patented Sept. 8, 1964

3,147,849
FILING APPARATUS
Richard P. Scholfield, Armonk, and Timothy F. Donovan, Peekskill, N.Y., assignors to Wheeldex Manufacturing Co., Inc., Peekskill, N.Y., a corporation of New York
Filed June 13, 1961, Ser. No. 116,830
20 Claims. (Cl. 198—158)

This invention relates to mechanized filing apparatuses carrying a plurality of cradles, and has particular reference to new and improved means for stabilizing the cradles in a generally horizontal plane through the various paths of movement.

Coupled with the increased demand by business and industry for new and improved filing media the filing apparatus art has attained a high level of development. Accordingly, the prior art provides numerous types of mechanized filing apparatuses which rapidly move filing cradles or the like to a position of access. Such filing apparatuses have many superior advantages, e.g., a minimum of floor space is utilized, and personnel have access to an increased filing space at a single position of access, thereby obviating personnel fatigue and the like.

In such mechanized filing apparatuses where cradles are suspended between spaced apart drive chains, the cradles must be necessarily maintained in a generally horizontal plane to prevent loss of papers, to maintain structural stability, and the like. While such cradles may be suspended by opposed pivot connections above their center of gravity to maintain them in a generally horizontal plane, such reliance wholly on gravity leads to many disadvantages. For instance, care must be taken to ensure that the weight is evenly distributed on the cradles to prevent inadvertent tilting of the cradles by virue of uneven weight distribution.

While numerous efforts have been advanced to provide means for positively stabilizing the cradles throughout their paths of travel, such prior art means have only enjoyed varying degrees of success. This is due to their complexity of structure resulting in a high cost as well as maintenance problems; or, the structures provided are not thoroughly reliable in operation.

An object of this invention is to provide a filing apparatus of the character described, having new and improved means for positively stabilizing the cradles in a generally horizontal plane throughout their path of movement.

Another object of this invention is to provide a new and improved filing apparatus having spaced apart upper and lower sprocket drive wheels driven by endless chains, cradle brackets carried by the chains for supporting cradles between opposed brackets, means to stabilize the cradles during their upward and downward paths of movement, and means to stabilize the cradles during their translation movement about the ends of the sprocket drive wheels.

Further objects of this invention include the provision of: (1) stabilizing brackets carried by the endless chains above and below each cradle bracket for stabilizing the cradle by novel means during upward and downward movement; (2) new and improved translation stabilizing means, wherein the cradles carry guide means which engage a gear linkage drive assembly carried, at least in part, by the apparatus frame during the translation movement of each cradle; (3) auxiliary sprocket translation stabilizing means which are driven from the endless chains, these sprockets carrying stabilizing arms which engage the cradles during the translation movement; (4) an arrangement of stabilizing brackets some of which stabilize the cradle during movement along the upward path and others of which stabilize the cradle during movement along the downward path; (5) novel locking means for adjacent brackets which include the provision of extending tabs and cooperating recessed portions; and (6) cradle stabilizing means which are of inexpensive and reliable construction, providing notably efficient stabilization of the cradles.

Still further objects, advantages, and novel features of this invention will become evident in the specification, claims, and accompanying drawings wherein:

Figure 1:
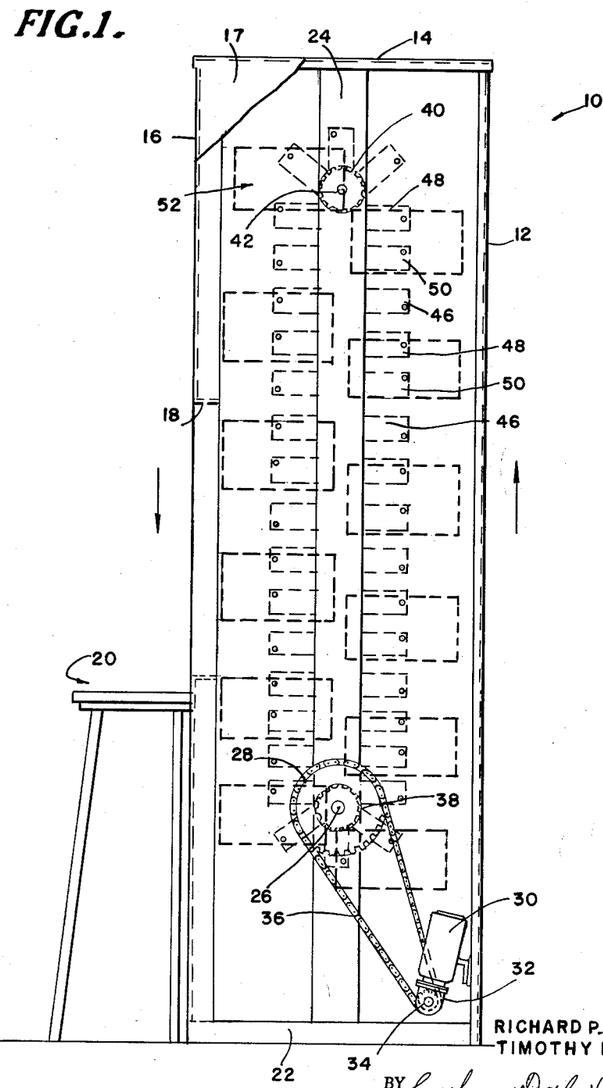
FIGURE 1 is a broken-out side elevation view of a filing apparatus according to one embodiment of the invention.

Reference is now made to the accompanying drawings wherein there is shown in FIGURE 1 a side elevation view of a filing apparatus 10 having a rear panel 12, top panel 14, front panel 16, and side panels 17, 17'. The front panel 16 has an opening 18 extending substantially across the front of the apparatus 10, this opening 18 providing access to the papers, and the like (not shown) carried by the apparatus 10, as will become evident. Suitable structural members (not shown) provide the necessary rigidity to this cabinet of the apparatus 10. There is conveniently provided a table 20 extending outwardly from the front wall 16 of the apparatus 10 where a person may handle papers removed from the filing apparatus 10.

Extending upwardly from a bottom frame 22 parallel to the side panels 17, 17', respectively, are opposed intermediate supporting frames 24, 24' secured at their upper ends to the top panel 14 by any suitable means (not shown).

The supporting frames 24, 24' conveniently receive a drive shaft 26 at their lower ends; and, carried on the drive shaft 26 between the frame 24 and the side panel 17 is a main drive wheel 28. A conventional electric motor drive 30 is mounted adjacent the rear wall 12, or the like. The motor 30 has a gear reduction unit 32 at its output end which, in turn, drives a wheel 34 extending therefrom. An endless chain 36 is trained about the wheels 28 and 34 in a conventional manner so as to impart rotational movement to the drive shaft 26. Suitable electric motor controls (not shown) are provided for operation of the motor 32.

The particular drive means described is merely an example of numerous possible drive means which may be employed, the drive means per se forming no part of the present invention.

Also carried by the drive shaft 26, adjacent the intermediate frame 24, is a lower sprocket wheel 38. Towards the upper end of the filing apparatus 10 an upper sprocket wheel 40 is provided, this wheel 40 being mounted on a shaft 42 rotatably carried by the intermediate supporting frame 24. An endless sprocket chain 44 (FIGURE 2) is trained about the upper and lower sprocket wheels 40 and 38, respectively, providing opposing upward and downward paths, as well as lower and upper translational joints adjacent the outer periphery of the sprocket wheels 38 and 40.

Carried by the sprocket chain 44 are a plurality of groups of spaced-apart brackets 46, 48 and 50, these brackets being arranged in repeating groups of three. The cradle brackets 48 each carry cradle 52 in a generally horizontal plane, the cradles 52 being adapted to carry filing papers, and the like. These cradles 52 are arranged closely adjacent one another during their upward and downward travel within the filing apparatus 10, thereby utilizing the space within the filing apparatus 10 to its maximum efficiency. The brackets 46 stabilize the cradles during downward movement; and the brackets 50 stabilize the cradles during upward movement, as will become evident.

While FIGURE 1 shows one side elevation view of the apparatus, it will be appreciated that the opposite side is symmetrical therewith, having substantially all the structural details shown in FIGURE 1. Thus, the drive shaft 26 is also journaled in the opposite intermediate frame 24′, and carries a second lower sprocket wheel 38′ (not shown); a shaft 42′ also carries a second upper sprocket wheel 40′ adjacent the opposite intermediate frame 24′. The wheels 40′ and 38′ (not shown) carry a second similar drive chain 44′, as is apparent. Such minor necessary modifications to the opposite side of the filing apparatus 10, e.g., the drive means, will be apparent to those skilled in the art.

Figure 2:
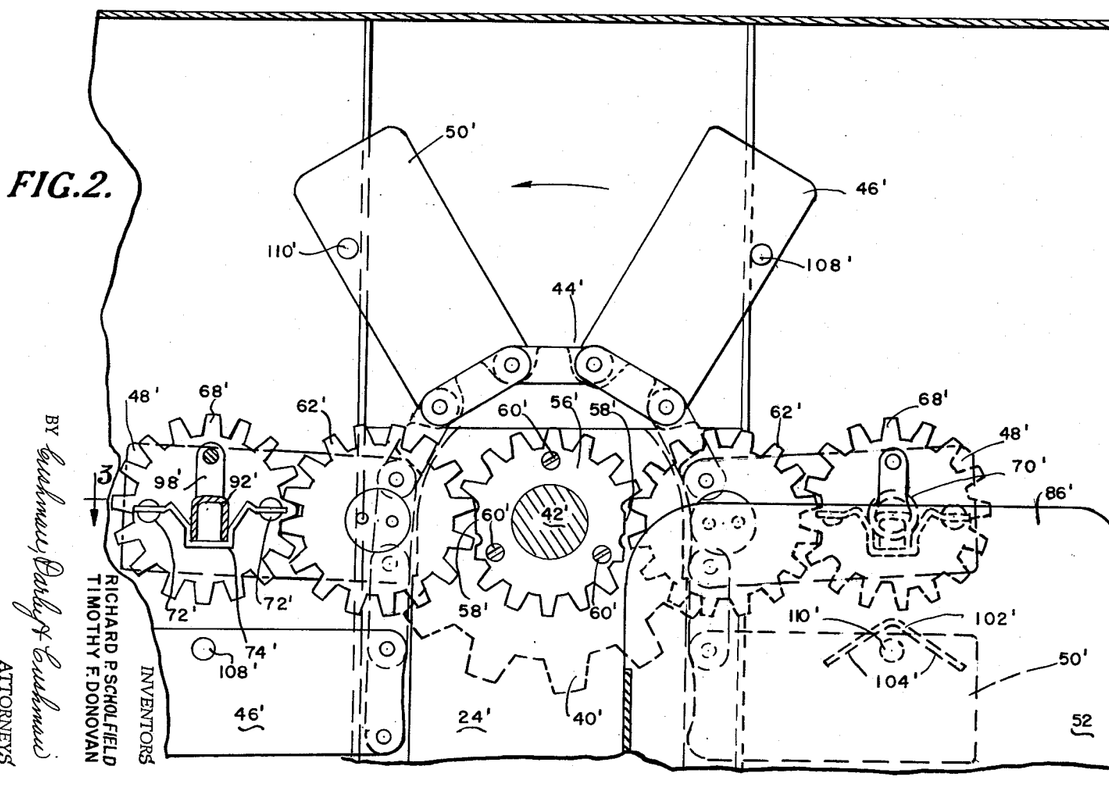
FIGURE 2 is an enlarged view of a typical portion of the drive and stabilizing mechanism.

Turning now to FIGURE 2, the upper end of the apparatus 10 opposite to the side shown in FIGURE 1 is presented.

Fixed to the frames 24, 24′ in concentric relationship to the shafts 42, 42′ carrying the upper sprocket wheel 40, 40′ are segmented gears 56, 56′ having generally vertically opposed cut-out portions 58. These segmented gears 56, 56′ are conveniently secured to the frames 24, 24′ as with spaced-apart machine screws 60.

Figure 3:
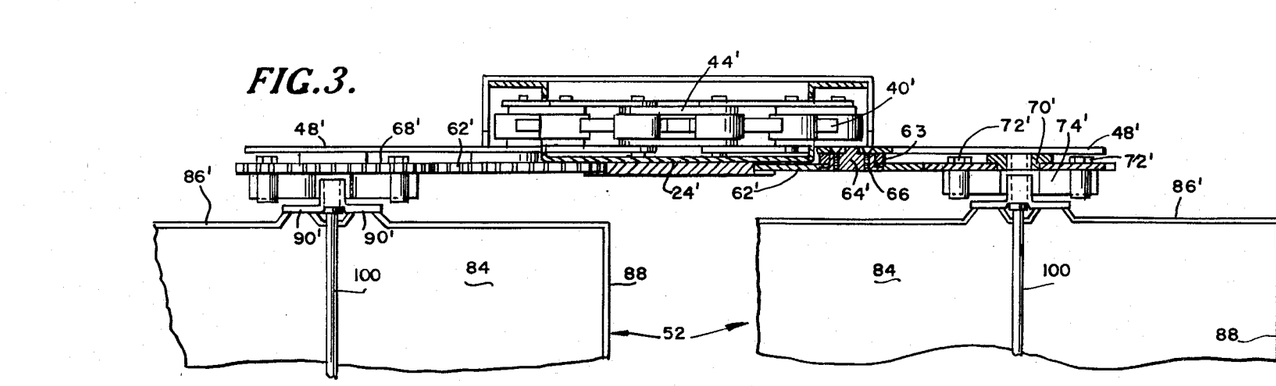
FIGURE 3 is a plan view taken substantially along line 3—3 of FIGURE 2.

Each of the cradle brackets 48, 48′ has an intermediate spacer gear 62, 62′ extending therefrom in alignment with the segmented gears 56, 56′. The spacer gears 62, 62′ are conveniently secured to the brackets 48, 48′ (FIGURE 3) by stub shafts 64, 64′ having machine screws 66 in engagement therewith, and a flange portion at its free end. A washer 63 may provide the desired axial spacing between the bracket and the spacer gear 62′ (FIGURE 3). Thus, the spacer gears 62, 62′ rotate about the stub shafts 64, 64′ when engaged by the teeth of the segmented gear 56, 56′. Spaced outwardly from, and in engagement with the spacer gears 62, 62′ are stabilizer gears 68, 68′ also rotatably mounted on stub shafts 70, 70′ which, in turn, are fixed to the brackets 48, 48′.

Figure 5:
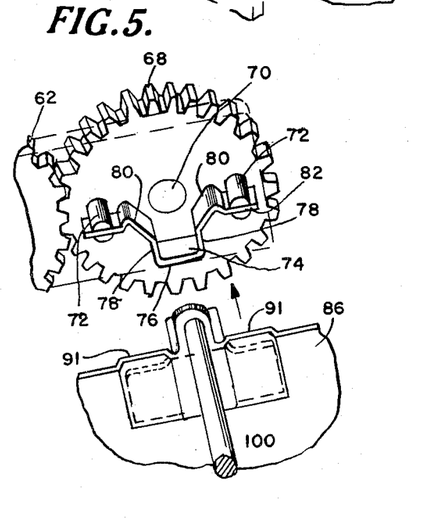
FIGURE 5 is a perspective view showing the mounting arrangement for a typical cradle.
Figure 6:
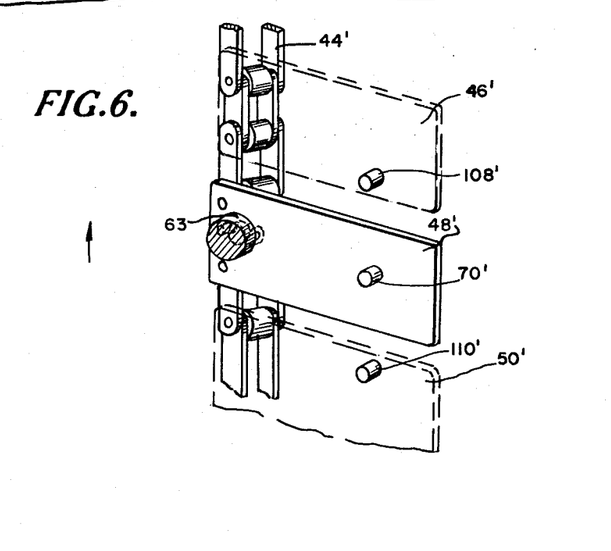
FIGURE 6 is a perspective view showing the brackets joined to one of the drive chains.

As best shown in FIGURES 2 and 5, each stabilizer gear 68, 68′ carries two radially opposed split pins 72, 72, and 72′, 72′. The split pins 72, 72, and 72′, 72′ each carrying U-members 74, 74′ having a flat bottom portion 76, parallel side portions 78, diverging portions 80, which thence are turned downwardly and outwardly to form horizontal arms 82, which engage the respective split pins. Thus, while the gears 68, 68′ are rotatable, the U-members 74, 74′ are each fixed with respect to the gear for reasons to become evident.

The segmented gear construction shown in FIGURE 2 is similar for each of the remaining sprocket drive wheels 40, 38 and 38′.

Figure 4:
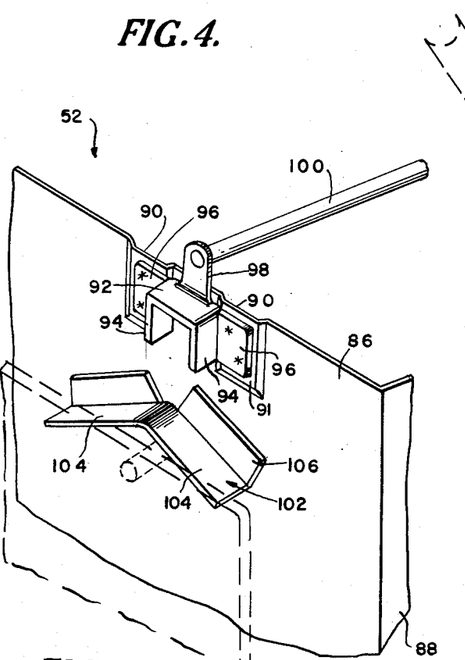
FIGURE 4 is a perspective view of one side of a typical cradle according to one embodiment of this invention.

Turning now to the cradle 52 construction as best shown in FIGURES 3, 4 and 5, the cradles 52 each include a horizontal platform 84 joined at its ends by vertical side walls 86, 86′. A back wall 88 may also be provided to prevent inadvertent loss of the papers within the filing apparatus 10. Preferably, the width of the opening 18 in the front panel 16 of the apparatus 10 corresponds generally to the distance between opposing side walls 86, 86′ of the cradle 52. The side walls 86, 86′ each have two struck-out portions 90, 90 and 90′, 90′ providing flat surfaces 91, 91′. Joined to the struckout portions 90, 90′ are inverted U-brackets 92, 92′ having opposed side walls 94, 94′ and flange portions 96, 96′ which are secured to the surfaces 90, 90′ by any suitable means. Extending upwardly from the U-brackets 92, 92′ are plates 98, 98′ which, in turn, carry a rod 100 across 52. The rod 100 may be conveniently utilized to carry filing folders having clips along their upper ends, or the like.

Disposed vertically below the U-brackets 92, 92′ are guide members 102, 102′ having upwardly converging walls 104, 104′ and flange portions 106, 106′ which are fixed to the side walls 86, 86′ of the cradle 52.

As previously stated, the brackets 46, 48 and 50 (and identical brackets 46′, 48′, and 50′) are arranged in repeating groups of three along the length of the chains 44 and 44′, respectively. The up stabilizer brackets 46, 46′ have pins 108, 108′ in the lower half, as viewed during movement along the upward path of the chains 44, 44′. Disposed below the cradle brackets 48, 48′ are generally similar down stabilizer brackets 50, 50′ having pins 110, 110′ in the upper half thereof as viewed during movement along the upward path of the chains 44, 44′.

As shown in FIGURE 2, the pins 110, 110′ are disposed intermediate the converging side walls 104, 104′ of the guide members 102, 102′ during movement of the brackets 50, 50′ along the upward path. By virtue of this arrangement, the pins 110, 110′ stabilize the bracket in the generally horizontal plane during this portion of the cradle 52 travel.

The inverted U-brackets 92, 92′ are engaged with the U-members 74, 74′ carried by the split pins 72, 72′ to provide a fixed connection therebetween.

As previously stated, the stabilizer gears 68, 68′ are rotatably mounted on the brackets 48, 48′ and are in operative engagement with the spacer gears 62, 62′ as each cradle 52 moves along each of the paths. During movement along the upward and downward paths, however, the gears 68, 68′ and 62, 62′ are idle, as these gears do not start to rotate until the gears 62, 62′ engage the stationary segmented gears 56, 56′.

As shown in FIGURE 2, the cradle bracket 48′ moves upward by virtue of its connection with the drive chain 44′ and spacer gear 62′ then engages the segmented gear 56′, starting a rotation of the gear 62′. As the gear 62′ starts to rotate, so also does the stabilizer gear 68′ as the bracket 48′ is moved along its translation path by hte chain 44′. The gears 56′, 62′ and 68′ are identical so that, as shown in FIGURE 2, gear 62′ will rotate counterclockwise alonog its upper translation path by virtue of its engagement with the teeth of the segmented gear 56′; and, the gear 68′ will rotate clockwise, thus, while the gear 68′ rotates, nevertheless, this gear will be maintained in its same position relative to the horizontal and, consequently, will positively maintain hte cradle 52 in the horizontal plane by virtue of the fixed engagement of the inverted U-bracket 92' with the U-member 74' fixedly carried by the rotating gear 68'.

As the bracket 48' starts its upper translational movement, by virtue of the particular obtuse angular relationship of the converging walls 104', engaged by the pins 110' carried by the bracket 50', a relative movement is provided therebetween the pin 110' sliding downwardly from the right-hand wall 104', thereby freeing this connection. As the bracket 48' moves about the translational path along the upper end of the sprocket wheel 40' to commence its movement along the downward path (e.g., the left-hand bracket 48' shown in FIGURE 2) pin 108' carried by the down-stabilizer bracket 46' will engage the guide member 102' in the manner generally identical to the engagement to the bracket 102' with the pin 110' of the up-stabilizer bracket 50'. For this reason, the brackets 46' and 50' have the pins on adjacent opposite end regions to provide for this symmetrical movement.

The construction of the lower sprocket wheels 38 and 38' and related structures are generally identical to the structure shown in FIGURE 2, of course, inverted or opposed, as necessary. Thus, when the bracekts 48, 48' move along their lower translation path the brackets 46, 46' will first be freed from the guides 102, 102' the spacer gear 62, 62' will engage the lower segmented gears 56, 56' and the cradle 52 will be stabilized in an identical manner.

The operation of this embodiment of the invention is as follows:

The inverted U-brackets 92, 92' of all the cradles are mated with the opposed U-members 74, 74' carried by the rotating stabilizing gears 68, 68' on the opposed brackets 48, 48'.

Those cradles 52 mounted on the upward path are engaged by their guide members 102, 102' with the opposed pins 110, 110' carried by the up stabilizer brackets 50, 50'. In a similar manner, those cradles 52 are mounted on the downward path are stabilized by the guide members 102, 102' engaged with the opposed pins 108, 108' carried by the down stabilizer brackets 46, 46'.

Those cradles 52 mounted on the upper and lower translation paths are joined only by the U-brackets 92, 92' mated with the U-members 74, 74', as is apparent.

The cradles 52 are driven by actuation of hte electric motor 30, which transmits rotary motion through the gear reduction unit 32, wheel 34, and wheel 28 through the drive chain 36. The wheel 28 drives the lower sprocket wheels 38, 38' through a common drive shaft 26, which, in turn, drives the chains 44 and 44'.

As the cradles 52 move along their upward path, carried by the stabilizing gears 68, 68' (which are here stationary) the cradles are stabilized in a generally horizontal plane by the pins 110, 110', as described.

When the cradles 52 approach the end of their upward path, the spacer gears 62, 62' carried by the cradle bracekts 48, 48' engage the segmented gears 56, 56', starting rotation of gears 62, 62' and 68, 68'. The pins 110, 110' are freed from the guides 102, 102' and the cradle is maintained in a horizontal plane by virtue of the fact that gears 68, 68' maintain their same position realtive to the horizontal, and the cradle 52 is fixed thereto.

As the cradle 52 ends its movement through the upper translation path, and starts its downward path, the gears 62, 62' and 68, 68' stop rotation, as gears 62, 62' are no longer in driving engagement with the gears 56, 56'. The guides 102, 102' carried by the cradle then move over the pins 108, 108', which stabilize the cradle 52 during movement along the downward path across the opening 18 in the front panel 16 of the apparatus 10 (FIGURE 1).

As each cradle 52 reaches the end of the downward path, the gears 62, 62' and 68, 68' are engaged by the lower segmented gears (not shown) similar to the arrangement shown in FIGURE 2. The pins 108, 108' are freed from the guides 102, 102', and after completion of this lower translation movement the gears stop rotating and the guides 102, 102' engage the pins 110, 110', and the cycle is repeated.

Thus, it is evident that the brackets 46, 46' are operative only during the downward path, and the brackets 50, 50' are operative only during the upward path and the cradles 52 are positively stabilized in a horizontal plane about the upper and lower translation paths in a superior and efficient manner.

Figure 7:
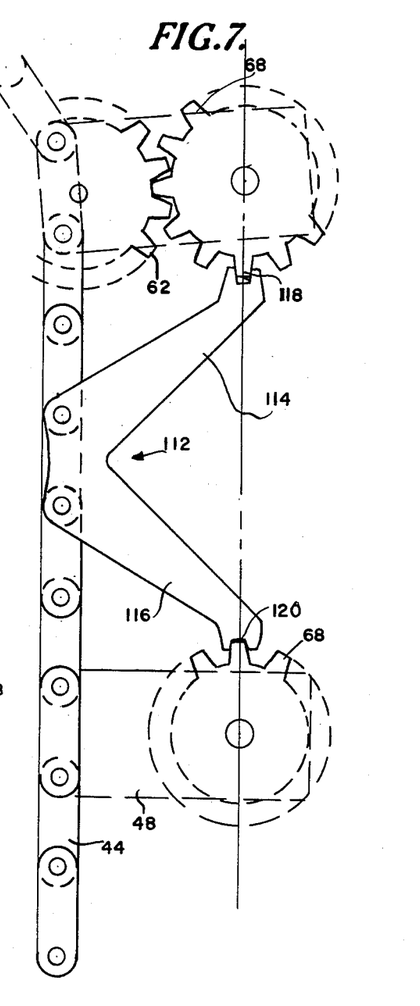
FIGURE 7 shows an alternative means for supporting the cradle during movement in its upward and downward paths.

Turning now to FIGURE 7, there is shown a modification of the arrangement of the brackets 46, 46', 50, 50', and the guides 102, 102' to provide stabilization for the cradle 52 along its upward and downward paths. There is shown in FIGURE 7 a bracket bar 112 (and one opposite thereto, not shown) carried by the sprocket chain 44 intermediate adjacent motor shelf cradle brackets 48, 48'. The bracket bar 112 includes upper and lower arms 114 and 116, respectively, each of which have gear tooth recesses 118 and 120, respectively, along a line passing through the axes of adjacent shafts 70. Thus, in this embodiment of the apparatus the brackets 46, 46' and 50, 50' are eliminated, and the engagement of the teeth on the gears 68, 68' with the respective recesses 118, 120' of the bracket bar 112 provides stabilization of the cradle 52 during movement along the upward and downward path. As is apparent in this embodiment, when the cradle brackets 48, 48' start their translational movement along the upper and lower ends of the path, the teeth of the gears 68 will become disengaged from the recesses 118 and 120', to allow the gear drive between the gears 56, 56', 62, 62' and 68, 68' to take over the translational stabilization. Likewise, during the downward movement of the gear the arms 114 and 116 will become inverted and support the gear 68 in the same manner.

Reference is now made to FIGURES 8–19 which show a modified embodiment of the filing apparatus disclosed in FIGURES 1–7. As with the previously described embodiments, there are provided intermediate supporting frames 24, 24' which carry a drive shaft 26 at the lower ends thereof, and upper shafts 42, 42' at the respective upper ends. The lower drive shaft 26 carries spaced apart lower sprocket wheels 38, 38' mounted outside the frames 24, 24'; and, the shafts 42, 42' carry aligned upper sprocket wheels 40, 40' also along the outside of the frames 24, 24'. Trained about the sprocket wheels 38, 40 and 38', 40' are endless drive chains 44, 44', respectively.

Again, there are provided stabilizer brackets 46, 46', cradle brackets 48, 48' and stabilizer brackets 50, 50' arranged in repeating groups of three.

Spaced below the axis of rotation of the upper sprocket wheels 40, 40' are auxiliary sprocket wheels 140, 140' carried by pins 142, 142' adjacent the inside of the frames 24, 24'. There are also provided lower auxiliary sprocket rings 144, 144' spaced above the axis of rotation of the lower sprocket drive wheels 38, 38', but along the inside surface of the frames 24, 24'. Thus, the sprocket wheels 38 and 40 lie in a common plane outside the frame 24, the sprocket wheels 140, 144 lie in a common plane inside the frame 24, the sprocket wheels 38', 40' lie in a common plane outside the frame 24', and the sprocket wheels 140', 144' lie in a common plane inside the frame 24'. The axes of all of these sprockets lie in a common plane, and the sprocket wheels are all of identical size and pitch.

Figure 8:
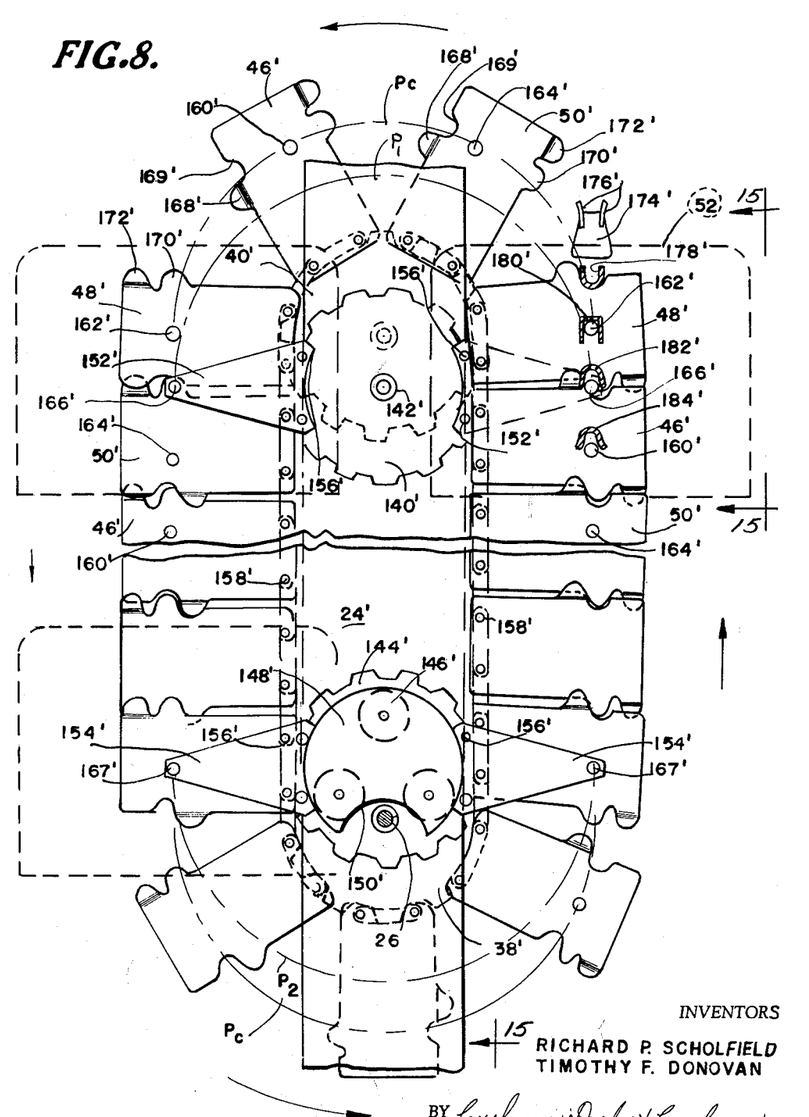
FIGURE 8 is a partial side elevation view of a modified embodiment of the filing apparatus shown in FIGURES 1–6.
Figure 9:
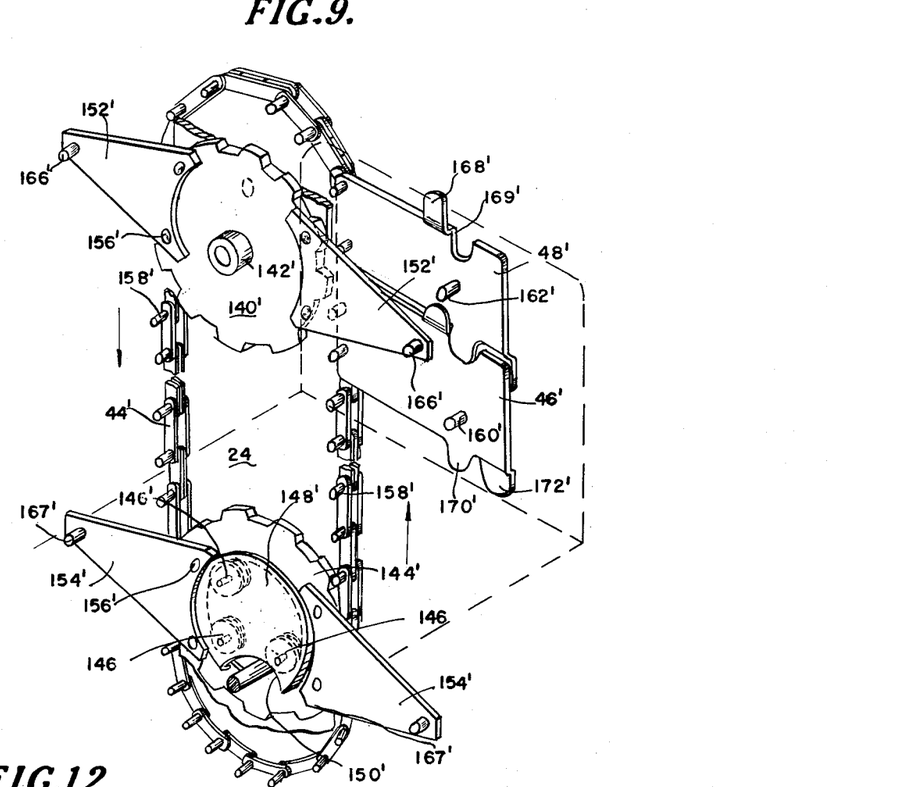
FIGURE 9 is a partial perspective view of the opposite side of the filing apparatus shown in FIGURE 8.

In order to provide for mounting the drive shaft 26 between the frames 24, 24' a novel securing means for the lower auxiliary sprocket rings 144, 144' is provided. The lower auxiliary sprocket rings 144, 144' are carried by a plurality of bearings 146 journaled to the frames 24, 24' at their outer ends, and journaled to cover plates 148, 148' at their inner ends. The two cover plates 148, 148' have lower cut-out portions 150, 150' to receive the drive shaft 26, as best shown in FIGURES 8 and 9.

Carried by each of the upper auxiliary sprocket wheels 140, 140' are two stabilizing arms 152, 152'; and, likewise, carried by each of the lower sprocket rings 144, 144′ are lower stabilizing arms 154, 154′. Each of these two groups of stabilizing arms extend outwardly from the respective auxiliary sprocket wheels in fixed relationship, 180° apart. These arms are joined to the inside surface of the respective auxiliary sprocket wheels by machine screws 156, best shown in FIGURES 8 and 9. The sprocket drive chains 44, 44′ carry at each link a roller pin 158, 158′ on pin shafts 159 (FIGURE 15) extending transversely from the chain links, which serve as connections to the brackets 46, 46′, 48, 48′, or 50, 50′. The above brackets are joined to the chains 44, 44′ by a connection between two adjacent pins 158 or 158′ so that the chain will not bind during its movement about the sprocket wheels 38, 40, and 38′, 40′. The roller pins 158, 158′ extend inwardly from the chains 44, 44′ a sufficient distance to engage the respective auxiliary sprocket wheels 140, 144 and 140′, 144′. Thus, the movement of the drive chains 44, 44′ also imparts rotary movement to these auxiliary sprocket wheels and their respective stabilizing arms 152, 152′, and 154, 154′ for reasons to become evident.

The stabilizer brackets 46, 46′ carry inwardly extending pins 160, 160′ in the lower region thereof (during upward movement); the cradle brackets 48, 48′ carry pins 162, 162′ intermediate the upper and lower ends thereof; and, the stabilizer brackets 50, 50′ carry pins 164, 164′ in the upper half thereof (during upward movement). Also, the stabilizing arms 152, 152′ carry inwardly extending pins 166, 166′ and the lower stabilizing arms 154, 154′ carry inwardly extending pins 167, 167′. The spacing of the pins one relative to the other will become apparent hereinafter.

Referring particularly to FIGURES 8, 9, 13 and 14, each of the brackets 46, 46′, 48, 48′, and 50, 50′ carry along their upper ends (as viewed during movement along the upward path) first extending tabs 168, 168′ in a plane generally parallel to one surface of an adjacent bracket. Adjacent to the tabs 168, 168′ are recesses 169, 169′. Carried by the lower edges of these brackets (as viewed during upward movement) are second tabs 170, 170′ spaced to engage the recesses 169, 169′. Outwardly adjacent the tabs 170, 170′ are third tabs 172, 172′, each of which is in a plane generally parallel to the bracket but opposite to that of the first tabs 168, 168′.

Thus, during movement along the upward path, e.g. FIGURE 9, the first tabs 168, 168′ engage one of the side wall surfaces adjacent the bottom edge of the adjacent brackets; the recesses 169, 169′ receive the second tabs 170, 170′; and, the outward upper end portion of the brackets receive the third tabs 172, 172′. By virtue of this arrangement of tabs and recesses, there is provided a locking engagement between adjacent brackets during travel along the upward and downward paths. As is apparent, the locking arrangement along the downward path is merely upside down to the arrangement along the upward path. Also, by virtue of the smoothly curved construction of the tabs and recesses, the brackets are easily separated one from the other at the end of the straight upward and downward paths of movement, as will become apparent.

Turning now to FIGURES 8, 11, 12 and 13 each cradle 52 is shown to have vertical side walls 86, 86′ at the ends of the horizontal platforms 84. These vertical side walls 86, 86′ carry a number of guide members used during various phases of movement of the cradle 52. Extending from the upper edge of the walls 86, 86′ are stabilizer guides 174, 174′ having opposed upwardly and outwardly flaring walls 176, 176′. Spaced below the guides 174, 174′ is a first upwardly facing U-guide 178, 178′; spaced below each of these brackets are first downwardly facing guides 180, 180′; spaced below each of these guides are second downwardly facing U-guides 182, 182′; and spaced below these downwardly facing U-guides 182, 182′ are third downwardly facing U-guides 184, 184′. The guides 174, 178, 180, 182, and 184 extend outwardly from the vertical side wall 86 along a common axis, the distance along the axis being such to engage various pins, to become apparent. The same arrangement of guides and pins applies to the opposite of the cradle 52, as depicted by corresponding prime numerals.

Figure 10:
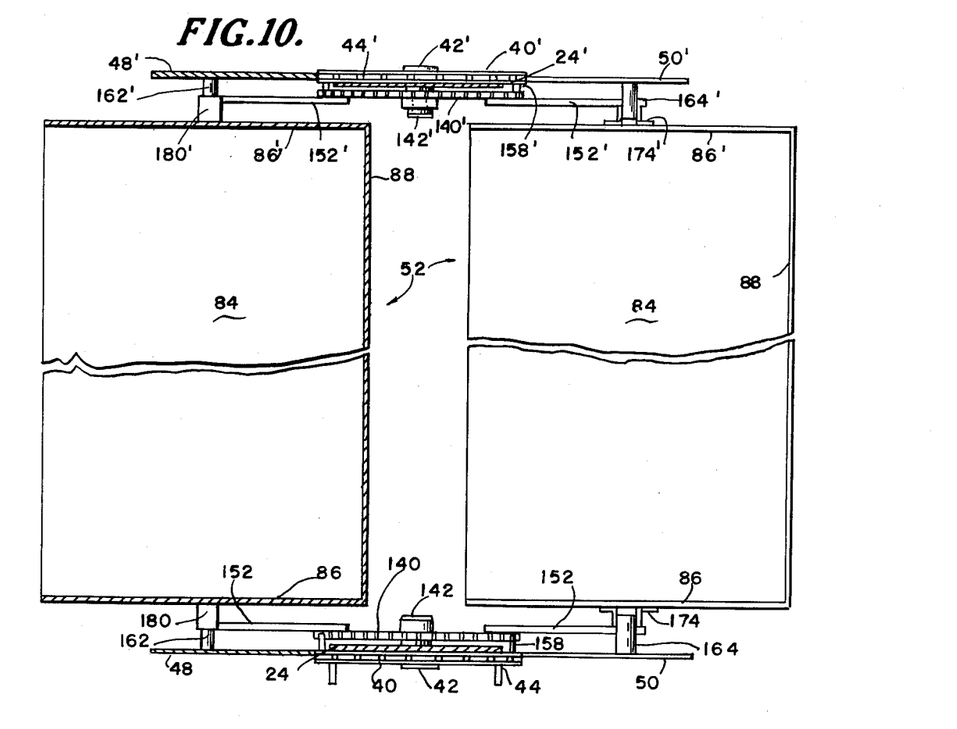
FIGURE 10 is a partial plan view of this modified filing apparatus.
Figure 11:
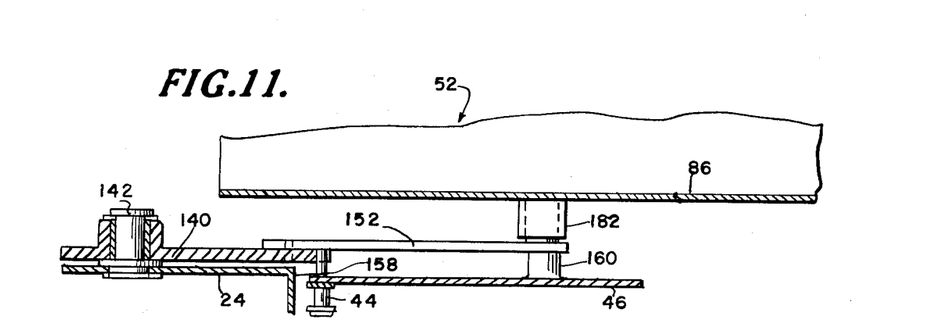
FIGURE 11 is an enlarged plan view, partially broken out, showing the arrangement of the cradle with respect to the drive and stabilizing means.
Figure 12:
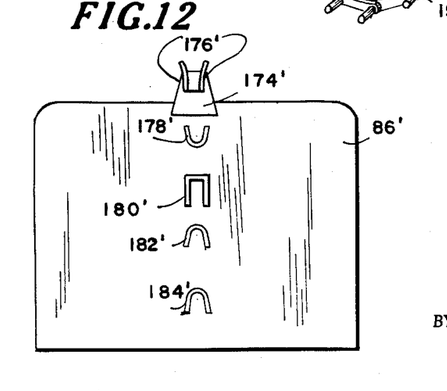
FIGURE 12 is one side elevation view of a typical cradle according to this embodiment of the invention.
Figure 13:
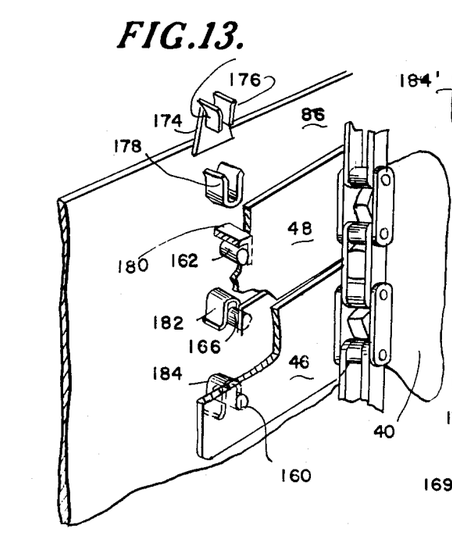
FIGURE 13 is a perspective view of the opposite side of the cradle shown in FIGURE 12 in engagement with certain stabilizing brackets.
Figure 14:
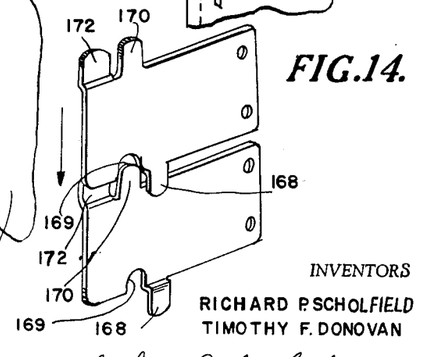
FIGURE 14 is a perspective view showing the means for joining adjacent brackets.
Figure 15:
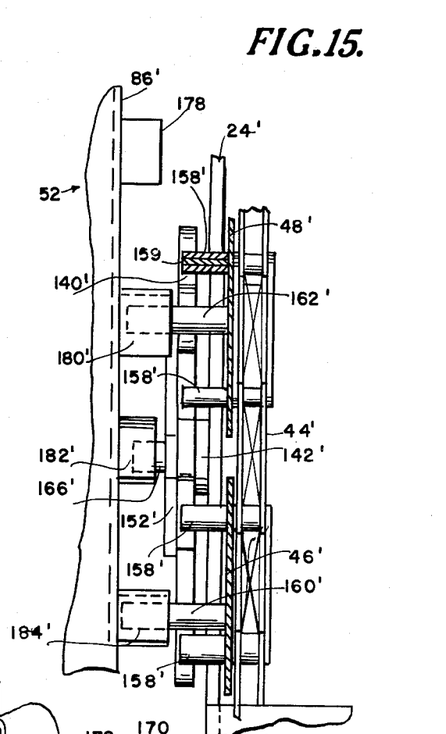
FIGURE 15 is a partial elevation view taken substantially along line 15—15 of FIGURE 18.

Turning now to FIGURES 10, 11 and 15 the cradle brackets 48, 48′ carry the cradle 52 by virtue of a pivotal engagement of the first downwardly facing guides 180, 180′ extending from opposite vertical side walls 86, 86′ with the pins 162, 162′.

Sufficient space is provided by the vertical side walls 86, 86′ and the brackets 46, 48, 50 and 46′, 48′ and 50′, respectively, to permit rotary movement of the stabilizing brackets 152, 152′ and 154, 154′ therebetween so that these stabilizing arms can then take over the stabilization of the cradles 52 during the movement about the upper and lower translation paths.

In FIGURE 10 the two uppermost cradles are shown, the left hand cradle 52 being about to complete its movement through the upper translation path, while the right-hand cradle 52 is about to start its movement through the upper translation path.

FIGURE 11 is a partially broken-out plan view of a stabilizing arm 152 about to take over stabilization of the cradle 52 during movement of the cradle through the upper translation path. The roller pins 158 extending from the chain 44 are shown in engagement with the upper auxiliary sprocket wheel 140.

FIGURE 15 shows a view generally similar to FIGURE 11, but in elevation, of the opposite side connection between the cradle 52 and one side of the associated linkage carried by the frame 24′ and the drive chain 44′.

The cooperative relationship of the guides carried by the side walls 86, 86′ of the cradles 52 with the pins carried by the brackets and stabilizing arms will best be understood by the description of the operation of the apparatus throughout the various paths of travel. Also, the spacing of the guides one relative to the other, as well as the cooperative spacing of the respective pins will become apparent.

In view of the fact that the cooperative relationship of the tabs and recesses carried by the brackets 46, 48, 50 and 46′, 48′ and 50′ has been discussed in detail, suffice to say that these tabs and recesses provide a locking engagement between adjacent brackets during movement along the upward and downward paths.

Figure 16:
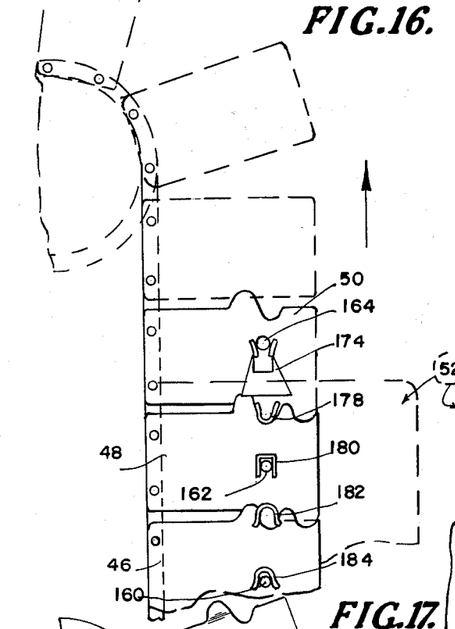
FIGURES 16–19 show a diagrammatic sequence of movement of the various stabilizing brackets in their different paths of travel.

Referring first to FIGURE 16, there is shown a partial diagrammatic view of a typical cradle 52 during movement along the upward path. The cradle 52 is carried by downwardly facing guides 180, 180′ engaging the pins 162, 162′ carried by the cradle brackets 48, 48′. Additionally, the pins 164, 164′ carried by the brackets 50, 50′ engage the stabilizer guides 174, 174′; and, the pins 160, 160′ carried by the brackets 46, 46′ engage the third downwardly facing stabilizer guides 184, 184′. As the chains 44, 44′ move upward, the upper stabilizing arms 152, 152′ are being driven by the roller pins 158, 158′ through the upper auxiliary sprocket wheels 140, 140′.

Figure 17:
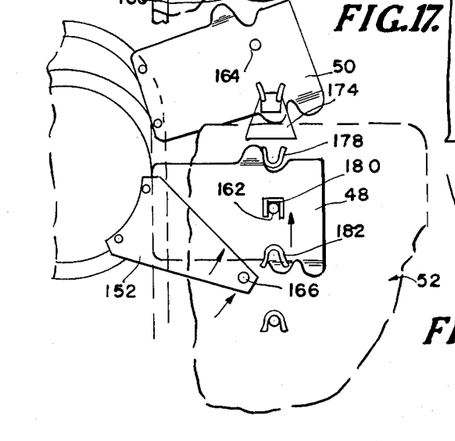

Turning now to FIGURE 17, one of the stabilizing arms 152 is moving counterclockwise while the cradle is moving in a straight line along its upward path. As the brackets 48, 48′ carrying the cradles 52 reach the end of the upward path, the pins 166, 166′ carried by these stabilizing arms become engaged with the second downwardly facing guides 182, 182′ at approximately the same time the up stabilizing brackets 50, 50′ start their upper translation movement and part engagement with the stabilizer guides 174, 174′. This arrangement is shown in FIGURE 17, wherein the bracket 50, pin 164 has just been freed from the guide 174 while the stabilizing arm 152 pin 166 has just been engaged with the second downwardly facing guide 182. During movement about the upper translation path the cradle 52 is carried by pins 162, 162′. The stabilizing arm pins 166, 166′ by virtue of their being carried by one pair of opposed stabilizing arms 152, 152', rotated by upper auxiliary sprocket wheels 140, 140' trace a path P₁ while in engagement with the guides 182, 182'. Thus, it is apparent that the cradle 52 is maintained in a generally horizontal plane by virtue of the fact that the opposed pins 166, 166' carried by a pair of upper stabilizing arms 152, 152', are maintained in a vertical plane within which also lie the pins 162, 162' carrying the cradle. Thus, there is provided a two-point vertical stabilizing support for the cradle along the upper translation path.

Figure 18:
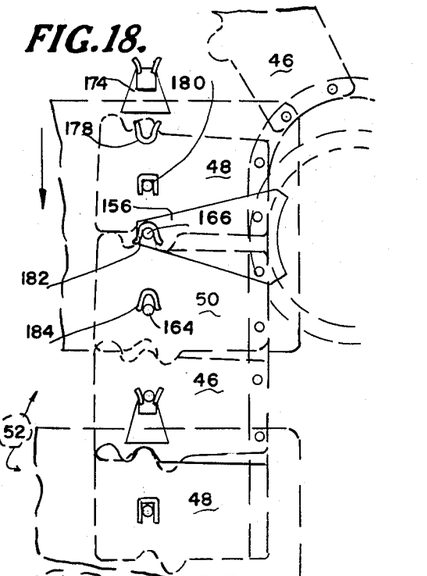

In FIGURE 18 the brackets 46, 46' are about to engage the stabilizer guides 174, 174' with their pins 160, 160'. The brackets 50, 50' have engaged the third downwardly facing guides 184, 184' with their pins 164, 164'; and the opposed pair of stabilizing arms 152, 152' is about to be released from the guides 182, 182'. As the stabilizing arms 152, 152 continue rotation in this view, the connection of the pins 166, 166' with the guides 182, 182' is freed and the cradle 52 moves along its downward path being stabilized by the pins 160, 160' engaged in guides 174, 174'; and, pins 164, 164' engaged in the guides 184, 184', respectively.

Figure 19:
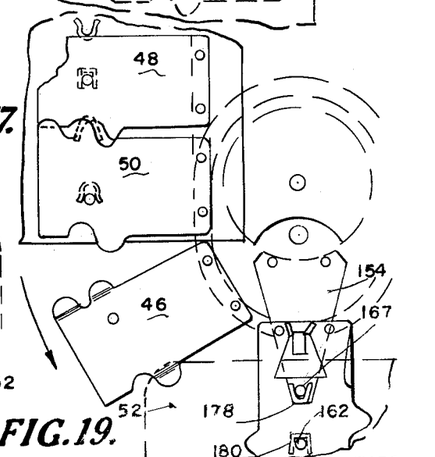

As the cradle 52 reaches the position shown generally in FIGURE 19, the cradle 52 is about to pass through the lower translation path. Similar to the arrangement described in FIGURE 17, an opposed pair of lower stabilizing arms 154, 154' engage, in this instance, the first upwardly facing U-guides 178, 178'. By virtue of this arrangement, the cradle 52 is stabilized by a two-point connection wherein the pins 167, 167' and the guides 178, 178' trace a path P₂, while the cradle 52 is carried along the path P_c, as before. As with the movement of the cradle 52 along the upper transmission path, the adjacent connection of pins 162, 162' with guides 180, 180' and the connection of the pins 167, 167' with the guides 178, 178' remain in a common vertical plane providing an efficient stabilization of the cradle 52.

As the cradle 52 ends its movement along the lower translation path, the connection between the pins 167, 167' and the guides 178, 178' are freed and the stabilization of the cradles 52 along their upward path takes place as shown in FIGURE 16.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. Motorized filing apparatus comprising upright opposed side frame means; spaced apart upper and lower sprocket wheels rotatably mounted adjacent each of said means; an endless sprocket chain trained about each of the upper and lower wheels thereby defining coextensive upwardly and downward paths of movement joined by coextensive upper and lower translation paths interconnecting the same; cradle supporting brackets carried by said chains in opposed relationship; cradles carried by opposed cradle supporting brackets for rotation with respect thereto during movement along said translation paths, enabling the cradles to be maintained in generally horizontal planes in each of said paths; and stabilizing means engageable with said cradles, movable therewith and movable relative to said cradle supporting brackets to rotate the cradles relative to the brackets and to maintain the cradles in said horizontal positions while moving along said translation paths.

2. Apparatus defined in claim 1 further including stabilizer bracket means carried by said chain means; and guide means carried by said cradles for engagement with said stabilizer bracket means for stabilizing said cradles in a generally horizontal plane in said upward and downward paths of movement.

3. Apparatus defined in claim 1 wherein said last-mentioned means includes a segmented gear mounted to said frame means in concentric fixed relationship to one of said sprocket drive wheels; and said transition stabilizing means includes a rotatable spacer gear carried by each of said cradle brackets for engagement with said segmented gear during movement about said translation path; a stabilizer gear rotatably carried by each of said cradle brackets in engagement with said spacer gear; and means joining said cradles to said stabilizer gears in fixed relationship, whereby during movement about said translation path, said cradles are positively maintained in a horizontal plane by said gears.

4. Apparatus defined in claim 1 wherein said last-mentioned means includes an auxiliary sprocket wheel rotatably carried by said frame means in an axis parallel to a sprocket drive wheel; means carried by the endless chain for driving said auxiliary sprocket wheel; at least one stabilizing arm extending from said auxiliary sprocket wheel, and said transition stabilizing means includes cooperating guide means carried by said cradle for operative engagement with said arm, whereby during movement about said translation path said stabilizing arm engages said guide means and said cradle is positively stabilized by rotation of said arm with said driven auxiliary sprocket wheel.

5. Apparatus defined in claim 1 wherein said last-mentioned means includes an auxiliary sprocket ring disposed in an axis parallel to a sprocket drive wheel; bearing means rotatably mounted to said frame means for carrying said auxiliary sprocket ring; means carried by the endless chain for driving said sprocket ring; at least one stabilizing arm extending from said auxiliary sprocket ring; and said transition stabilizing means includes cooperating guide means carried by said cradle for operative engagement with said arm, whereby during movement about said translation path said stabilizing arm engages said guide means and said cradle is positively stabilized by rotation of said arm with said driven auxiliary sprocket ring.

6. Apparatus defined in claim 2 wherein said stabilizer bracket means includes bracket bars carried by said chain means between adjacent cradle brackets, gear means operatively carried by said cradles in fixed relationship thereto, said bracket bars including upper and lower gear receiving portions for engagement with adjacent cradle gear means during movement in said upward and downward paths.

7. Apparatus defined in claim 2 wherein said stabilizer bracket means includes first stabilizer brackets and second stabilizer brackets, both of said brackets disposed adjacent each cradle bracket, so that said brackets are arranged in repeating groups of three about said endless chain.

8. Apparatus defined in claim 7 including cooperating tab means extending from said brackets for engagement with adjacent brackets to provide a locking engagement between the brackets during movement along said upward and downward paths.

9. Motorized filing apparatus comprising: opposed side frame means; spaced apart upper and lower sprocket drive wheels rotatably mounted to each of said side frame means in opposed relationship; an endless sprocket chain trained about each of said upper and lower sprocket drive wheels thereby defining vertically upward and downward paths of movement joined by upper and lower translation paths of movement; cradle brackets carried by said endless chains in opposed relationship; stabilizing brackets carried by said endless chains adjacent said cradle brackets; cradles having cradle bracket engaging means for engagement with opposed cradle brackets, said cradles also having guide means extending therefrom for operative engagement with said stabilizing brackets for stabilizing said cradles in a generally horizontal plane during movement along said upward and downward paths; spaced apart upper and lower auxiliary sprocket wheels rotatably mounted to each of side frame means; means carried by said endless sprocket chains for driving said auxiliary sprocket wheels; translation stabilizing means carried by said auxiliary sprocket wheels; and translation guide means extending from said cradles for engagement with said translation stabilizing means during movement about said translation paths thereby providing stabilization of said cradles in a generally horizontal plane.

10. Apparatus defined in claim 9 including tab means extending from said brackets for engagement with adjacent brackets to provide a locking engagement between said brackets during movement along said upward and downward paths.

11. Apparatus defined in claim 9 including a common drive shaft engaged with a pair of said opposed sprocket drive wheels; bearing means mounted to said frame means adjacent each of said pair of drive wheels, said auxiliary sprocket wheels adjacent to said pair of drive wheels being of annular shape and carried by said bearing means, whereby said drive shaft passes through the plane of rotation of said auxiliary sprocket wheels.

12. Apparatus defined in claim 11 including a cover plate joined to said frame means and carrying said bearing means, said cover plate having a cutout portion receiving said drive shaft.

13. Apparatus defined in claim 9 wherein said stabilizing brackets include first brackets and second brackets, each of said first brackets being adjacent one edge of said cradle brackets and each of said second brackets being adjacent the opposite edge of said cradle brackets, said cradle guide means disposed to provide stabilization of said cradle by said first brackets in said upward path, and stabilization of said cradle by said second brackets in said downward path.

14. Apparatus defined in claim 13 wherein said cradle guide means also provides stabilization of said cradle in said upward path by said second brackets, and stabilization in said downward path by said first brackets.

15. Apparatus defined in claim 14 wherein said cradles are carried by said cradle brackets intermediate said cradle guide means whereby said first and second brackets stabilize said cradles both above and below the axis of said cradle bracket engaging means.

16. Apparatus defined in claim 9 wherein said each of said upper and lower auxiliary sprocket wheels are disposed in planes inwardly of the planes of said drive sprocket wheels, said stabilizing arms thereby rotate in planes between adjacent drive sprocket planes adjacent the sides of said cradles.

17. Apparatus defined in claim 9 wherein said auxiliary sprocket wheels and said sprocket drive wheels are of substantially the same pitch diameter and sprocket tooth pitch.

18. Apparatus defined in claim 9 wherein the axes of rotation of said opposed upper and lower auxiliary sprocket wheels are spaced parallel between the axes of rotation of said opposed upper and lower drive sprocket wheels.

19. Apparatus defined in claim 9 wherein the translation stabilizing means on said cradles include two U-guides inverted one to another on opposite sides of said cradle bracket engaging means, one U-guide being positioned to engage an upper stabilizing arm, and the other U-guide being positioned to engage a lower stabilizing arm, whereby during movement of said cradles in said translation paths, said cradles engaging means lie in a common vertical plane with one of said U-guides.

20. Apparatus defined in claim 9 wherein said auxiliary sprocket wheels each carry two oppositely extending stabilizing arms.

References Cited in the file of this patent
UNITED STATES PATENTS

| | | |
|---|---|---|
| 1,978,205 | Ide | Oct. 23, 1934 |
| 2,125,619 | Parent | Aug. 2, 1938 |
| 2,745,706 | Mendelsohn | May 15, 1956 |
| 2,816,000 | Scholfield | Dec. 10, 1957 |
| 2,912,118 | Behrens | Nov. 10, 1959 |
| 2,940,810 | Graber | June 14, 1960 |
| 3,034,636 | Manna | May 15, 1962 |